(12) United States Patent
Baron et al.

(10) Patent No.: US 7,123,295 B2
(45) Date of Patent: Oct. 17, 2006

(54) MEMORY MANAGEMENT IN AN IMAGE CAPTURING DEVICE

(75) Inventors: John M. Baron, Longmont, CO (US); Beth M. P. Delaney, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 763 days.

(21) Appl. No.: 09/934,626

(22) Filed: Aug. 22, 2001

(65) Prior Publication Data

US 2004/0201737 A1 Oct. 14, 2004

(51) Int. Cl.
*H04N 5/76* (2006.01)

(52) U.S. Cl. .................................... 348/231.2

(58) Field of Classification Search ........... 348/231.98, 348/231.1, 231.2, 231.3, 231.4, 231.5, 231.6, 348/231.7, 231.8, 231.9
See application file for complete search history.

(56) References Cited

U.S. PATENT DOCUMENTS

| | | | |
|---|---|---|---|
| 5,493,677 A * | 2/1996 | Balogh et al. ........... 707/104.1 |
| 5,534,921 A | 7/1996 | Sawanobori ................ 348/333 |
| 5,648,816 A | 7/1997 | Wakui ........................ 348/233 |
| 5,706,457 A * | 1/1998 | Dwyer et al. ................ 715/835 |
| 5,737,014 A | 4/1998 | Tojo et al. ................... 348/220 |
| 5,861,918 A | 1/1999 | Anderson et al. ........... 348/233 |
| 5,956,084 A | 9/1999 | Moronaga et al. .......... 348/233 |
| 6,199,073 B1 * | 3/2001 | Peairs et al. ................ 707/204 |
| 6,208,380 B1 | 3/2001 | Misawa ...................... 348/233 |
| 6,239,837 B1 | 5/2001 | Yamada et al. ............. 348/231 |
| 6,421,080 B1 * | 7/2002 | Lambert ..................... 348/143 |
| 6,445,460 B1 * | 9/2002 | Pavley ....................... 358/1.15 |
| 6,522,354 B1 * | 2/2003 | Kawamura et al. ...... 348/231.2 |
| 6,630,954 B1 * | 10/2003 | Okada ...................... 348/231.7 |
| 6,668,134 B1 * | 12/2003 | Niikawa ...................... 386/95 |
| 6,747,689 B1 * | 6/2004 | No et al. .................. 348/207.2 |

FOREIGN PATENT DOCUMENTS

JP 09037125 A * 2/1997

* cited by examiner

*Primary Examiner*—Vivek Srivastava
*Assistant Examiner*—Justin Misleh

(57) ABSTRACT

An image capturing device includes a processor, at least one interface, and a memory. The memory is capable of storing a plurality of records. A record includes image storage data, date/time data, and status data. The processor determines whether any of the images in the memory have been archived as indicated by the status information in the status storage cell of the records, and replaces one or more archived images with newly captured images as the device is used.

19 Claims, 3 Drawing Sheets

MEMORY MANAGEMENT IN AN IMAGE CAPTURING DEVICE

FIELD OF THE INVENTION

The present invention relates generally to an image capturing device, and more particularly to memory management in an image capturing device.

BACKGROUND OF THE INVENTION

Digital still image capturing devices typically capture light with an electronic image sensor in order to capture an image. The captured image is stored in a memory. A typical digital image may range in size from about 20 kilobytes to about 4 megabytes, depending on the image resolution and the image compression algorithm being used. However, a memory of an image capturing device can store only a limited amount of images. Memory capacity is therefore a concern in digital still image capturing devices.

The prior art approaches the memory problem by typically including an internal image memory, a removable memory medium, or sometimes both. A user can address memory limitations by managing (i.e., selectively and periodically deleting) the images in the camera. Alternatively, the user may buy additional memory media in order to avoid a memory shortage. Managing the images in the camera may include deleting images and/or transferring images to an external device for storage. After they have been transferred, the user can delete the images from the camera's memory and take more images.

However, there are several drawbacks in memory use in the prior art. If the internal memory becomes filled up, the user cannot take any more pictures. The user must then manually delete images even if the user had previously copied images out of the internal memory and archived them on another device. Worse, if the user is at a location where it is not possible to transfer internally stored images to another storage device, the user will not be able to take any more pictures unless some stored images are deleted (without having been saved in another device). This places a burden on the user, who may be distracted from the process of setting up a shot in order to check the memory and to transfer and/or delete images.

In another prior art approach, some prior art cameras delete all images that are transferred from the internal memory. This is done in order to maintain the largest amount of available memory. As a result, these images are no longer available to the camera for review, sharing (i.e., showing to friends via the camera-back display), or further downloading to printers or other computer devices. In this prior art approach, the user must pay more attention to the downloading process, as the user can only download an image once. If the user accidentally deletes an image, it is gone. The user cannot transfer it out of the camera again.

Therefore, there remains a need in the art for improvements in memory management in image capturing devices.

SUMMARY OF THE INVENTION

An image capturing device comprises a processor, at least one interface, and a memory. The memory is capable of storing a plurality of records. A record includes image data, date/time data, and status data. Each of these pieces of information is stored in a separate cell of the memory. The processor determines whether the memory includes any archived images as indicated by status information in the status storage cell and replaces one or more archived images.

DETAILED DESCRIPTION

Figure 1:
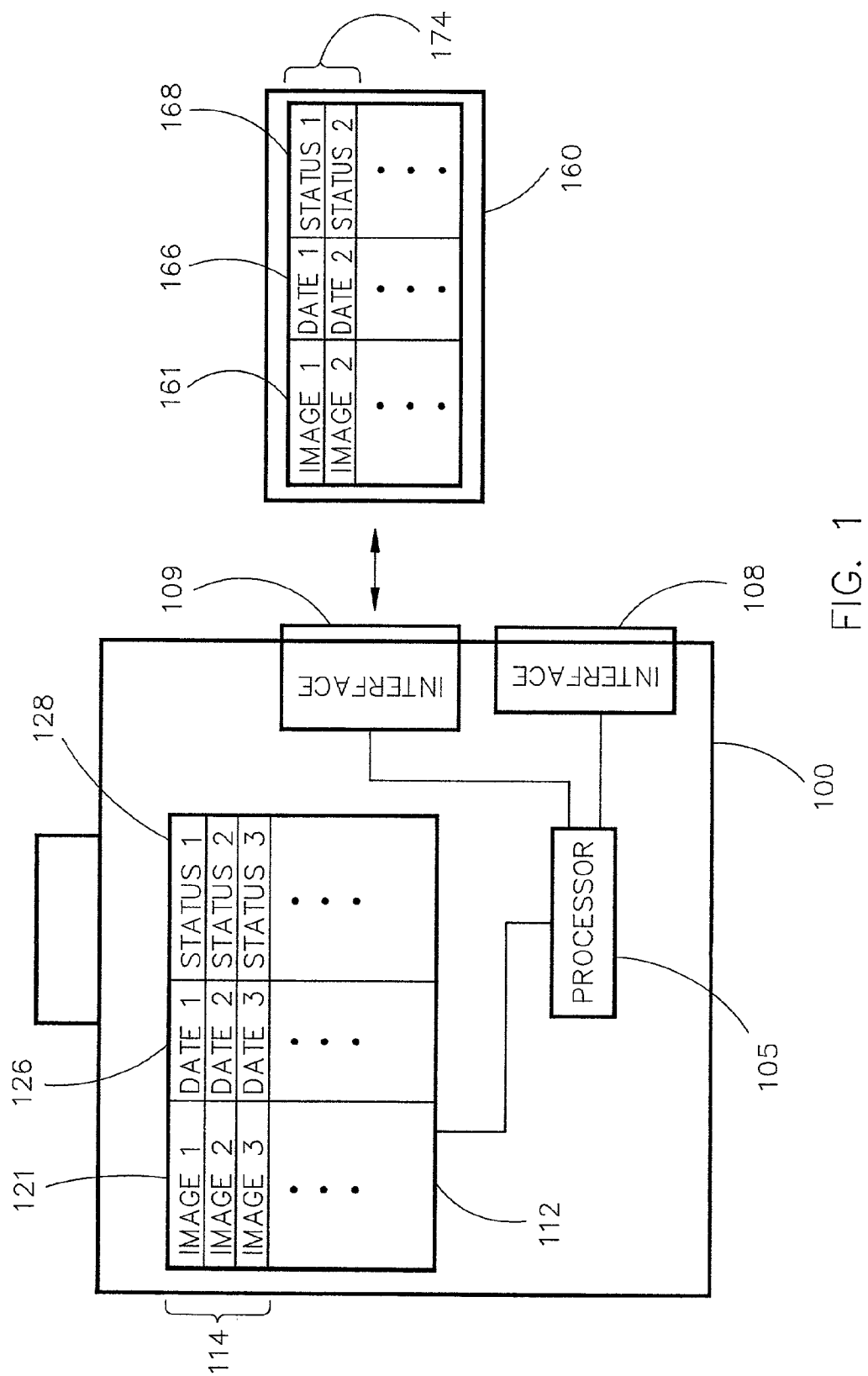
FIG. 1 is a block diagram of a digital still image capturing device according to one embodiment of the invention.

FIG. 1 is a block diagram of a digital still image capturing device 100 according to one embodiment of the invention. The image capturing device 100 includes a first interface 108, a second interface 109, an internal memory 112, and a processor 105. In addition, the image capturing device 100 may be capable of receiving and communicating with a removable memory medium 160 for storage of images.

The first interface 108 may be a cable interface for connecting the image capturing device 100 to any manner of external storage device. The connection may be established for image transfer or archiving. The first interface 108 therefore may be a USB (Universal Serial Bus) cable interface, for example. Alternatively, the first interface 108 may be any other type of cable interface such as a serial or parallel interface, or may be a wireless infrared (IR) or radio link interface that includes at least a transmitter device.

The second interface 109 may be an interface for receiving a removable memory medium 160, such as a memory card, CD-ROM, computer floppy disk, etc.

It should be noted that the image capturing device 100 may include only the first interface 108, only the second interface 109, or both devices together.

The processor 105 may be any type of general purpose processor. The processor 105 executes a control routine contained in the internal memory 112. In addition, the processor 105 executes an image capture function and may store digital images to the internal memory 112. Furthermore, the processor 105 controls transfers of digital images to other devices, such as a transfer of digital images to an external memory or other external device.

The internal memory 112 and the removable memory medium 160 may be any type of memory, including all types of random access memory (RAM), erasable programmable read-only memory (EPROM), flash memory, magnetic storage media such as magnetic disc, tape, etc., or optical or bubble memory. The internal memory 112 may include, among other things, a plurality of records 114. Each record 114 may include image data 121, date/time data 126, and status data 128. Therefore, each record 114 may include an image, date/time information, and status information associated with the image. Likewise, the removable memory medium 160 may store a plurality of records 174 that may include image data 161, date/time data 166, and status data 168. The discussion will refer mainly to the internal memory 112 for purposes of simplicity.

The date/time data 126 indicates the date and time of image capture of the associated image data 121. The date and time may be stored according to any desired format.

The status data 128 indicates whether the particular image has been archived or not. The status data 128 may be a flag (or other variable) that indicates the status of the associated image. Typically, upon image capture, the status data 128 is set to a non-archived status. The status data 128 is set to an archived status whenever its corresponding image is copied out of the internal memory 112.

Archiving an image is the action of transferring a copy of the image out of the internal memory 112 and to another device (i.e., downloading the image). The original image remains in the internal memory 112. An image may be archived (copied) to other devices, such as to a removable memory medium 160 connected to the second interface 109. Alternatively, an image may be archived to a computer or other device for storing or processing images communicated through a cable attached to the first interface 108. The image transfer and archiving may be done for purposes of image manipulation, storage, and printing, among other things.

In use, if the internal memory 112 is full, the processor 105 may replace one or more archived images with a newly captured image. The processor 105 may determine if any images in the internal memory 112 have been archived by reading the status storage data 128 from the plurality of records 114. The newly captured image may replace more than one existing, archived image, depending on the sizes of the respective images. The order of replacement of archived images may be based on a stored date and time. For example, an oldest archived image may be replaced first.

It should be understood that although the memory management is described for the internal memory 112 of the image capturing device 100, the memory management according to the invention may be equally well applied to the removable memory medium 160. Each image stored in the removable memory medium 160 may include a corresponding data and status information, and an archived image may be replaced with a new image, as previously discussed. The only difference is that although the images in the removable memory medium 160 may be marked as archived when in communication with the image capturing device 100, the images may not necessarily be marked as archived when not in the image capturing device 100. However, the archiving may be accomplished in an external device if the external device performs a compatible archive marking procedure as described herein.

Figure 2:
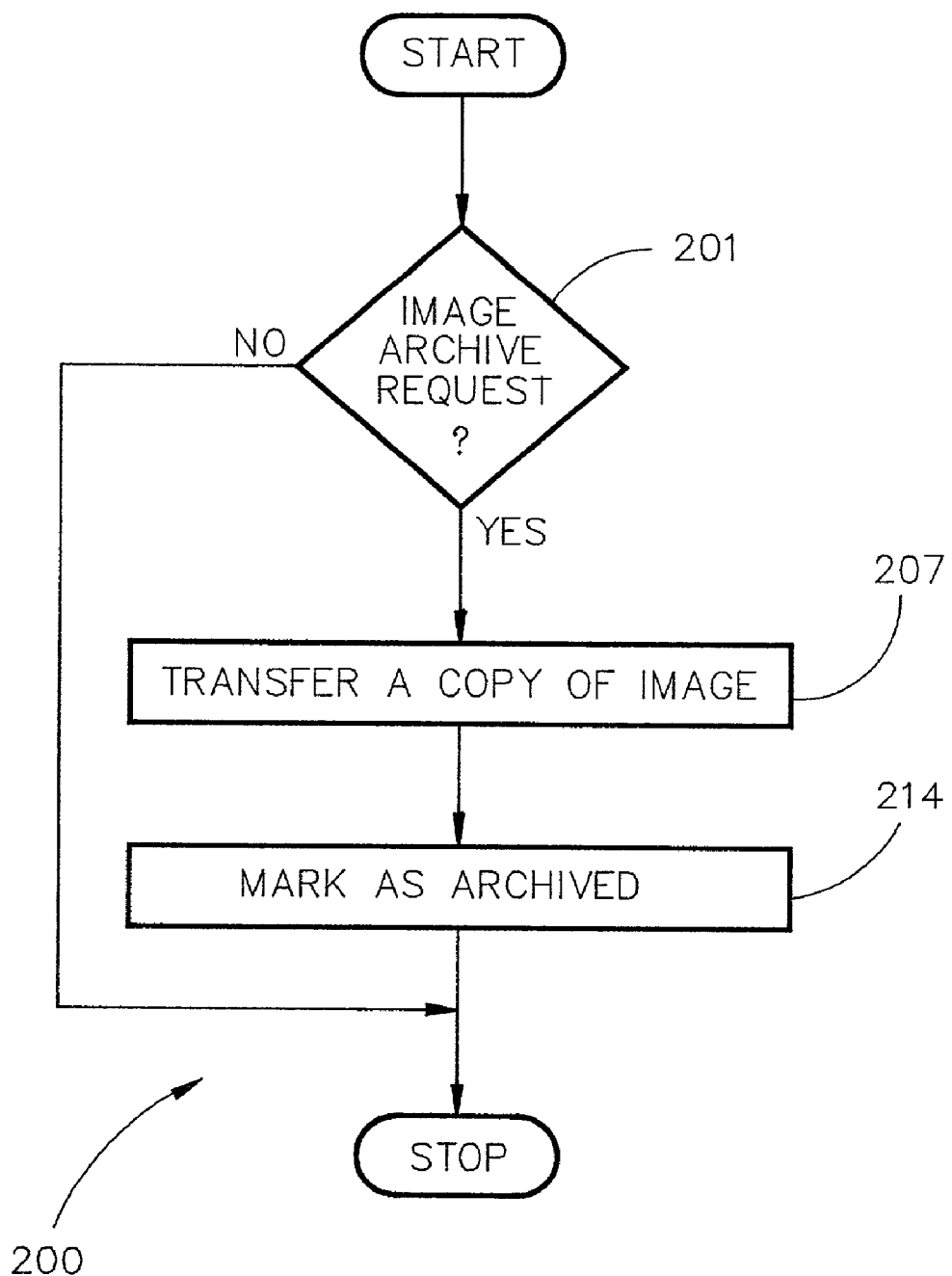
FIG. 2 is a flowchart of memory management method according to another embodiment of the invention.

FIG. 2 is a flowchart 200 of memory management method according to another aspect of the invention. In step 201, the method detects whether an image archiving request has been received. The image archive request may take several forms. It may be a transfer of an image from a record 114 in the internal memory 112 to a removable memory medium 160. It may be transfer of an image from the internal memory 112 to an external device, such as to an external computer or docking station. Alternatively, it may be the transfer of an image from a removable memory medium 160 to a computer or other storage device. In another alternative, the transfer of an image may be caused by insertion of a removable memory medium 160 into the second interface 109. The insertion may automatically prompt transfer of images from the internal memory 112 to the removable memory medium 160 (assuming that the images in the internal memory 112 are merely copied and not deleted). If no image archiving request has been received, the method exits. Otherwise, it proceeds to step 207.

In step 207, a copy of the image is transferred from the internal memory 112.

In step 214, the image is marked as archived. The status data 128 in an associated status storage cell of the record 114 is changed to an archived state. The image still resides in the record 114, but it is now deletable if memory space is needed. This method may be repeated for multiple image transfers or for blocks of images.

As previously discussed, although the method refers to the internal memory 112, the method may likewise apply to the removable memory medium 160.

Figure 3:
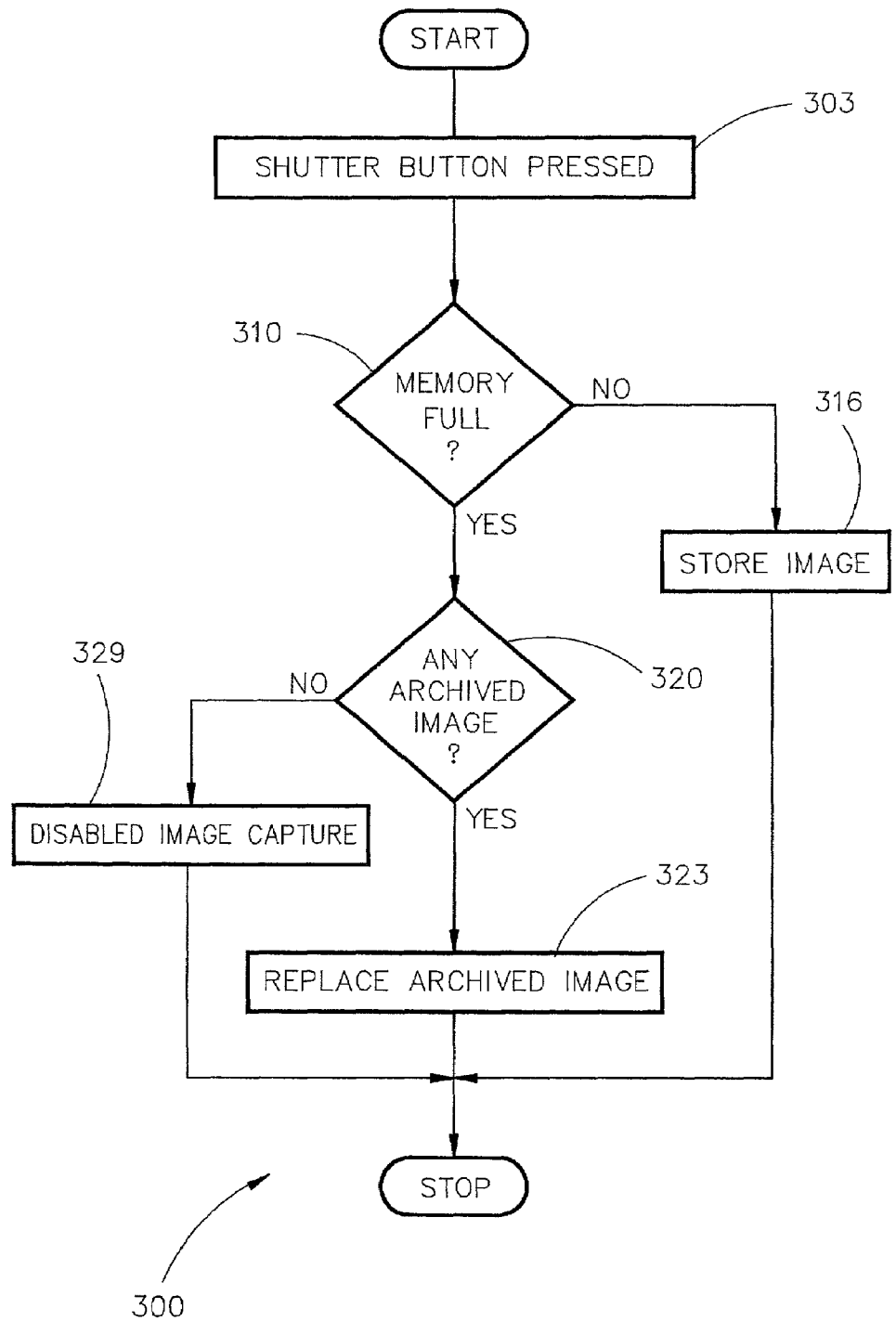
FIG. 3 is a flowchart of memory management method according to yet another embodiment of the invention.

FIG. 3 is a flowchart 300 of memory management method according to yet another embodiment of the invention. In step 303, the start of an image capture is detected. This may be done at the press of a shutter button (not shown).

In step 310, it is determined whether the internal memory 112 is capable of storing an additional image. If the internal memory 112 does not have enough space, the method proceeds to step 320; otherwise, it branches to step 316.

In step 316, because space exists in the internal memory 112, the image is stored in the available memory space and the method exits.

In step 320, it is determined whether there are any archived images in the internal memory 112. This may be done by checking status data 128 in the status storage cells of the records 114. If the internal memory 112 does not contain any archived images, the method branches to step 329 and image capture is disabled. Otherwise, it proceeds to step 323.

The task of determining where the next image will be stored (i.e., which archived images are replaced first) may be done upon completion of an image capture or it may be done when the shutter button is pressed. If done when the shutter button is pressed, the memory is scanned or a file allocation table is checked to see if memory is available or if archived images are available to be replaced. Although this method is straightforward and acceptable, it imposes some delay between a press of the shutter button and storage of an image.

Alternatively, the availability checking may be done upon completion of an image capture and before the shutter button is pressed again (i.e., the overwrite determination may occur at the finish of a previous image capture). This advantageously reduces the time between pressing the shutter button and taking and saving an image. In addition, if the memory does not have sufficient space and -no archived images are present, this method allows ample notification to the user that the user will need to delete or archive some images before the user tries to capture another image.

In step 323, the archived image in the internal memory 112 is replaced. In addition, the status variable of the replaced archived image is changed to a non-archived status. Therefore, the image capturing device 100 automatically and transparently determines which images in the internal memory 112 may be overwritten with new images. Note that more than one archived image may have to be replaced, depending on the sizes of the images involved.

In step 329, the image capture is disabled. This may include disabling the shutter button and may further include visual and audible warnings to the user that the internal memory 112 is full.

As previously discussed, although the method refers to the internal memory 112, the method may likewise apply to the removable memory medium 160.

The memory management of the invention provides several advantages. The user does not have to manage the memory, does not have to be mindful of the amount of images already in the memory, and does not have to keep track of which images have already been archived. The archived images are transparently replaced if the memory is full, without any need for action or mindfulness on the part of the user. In addition, the memory management allows more images to be stored in the memory (i.e., the invention allows the memory to always hold a full set of images).

These are available for review, are available for sharing via the camera-back display, and moreover are available for downloading.

We claim:

1. An image capturing device, comprising:
 a processor;
 at least one interface communicating with said processor and capable of transferring images out of said image capturing device; and
 a memory communicating with said processor and capable of storing a plurality of records, with a record including image data and image status data indicating whether a copy of the image has been transferred out of the device;
 wherein said processor is configured to determine whether said Memory includes any archived images as indicated by said status data and is configured to replace one or more archived images in said memory with a newly captured image when insufficient free space exists in said memory to store said newly captured image; and
 wherein said processor is configured to disable image capture if said memory is full and said memory does not contain any archived images.

2. The device of claim 1, wherein said at least one interface is a communication interface capable of transmitting a stored image to an external device.

3. The device of claim 1, wherein said at least one interface is a USB cable interface.

4. The device of claim 1, wherein said at least one interface is a removable memory medium interface capable of transmitting a stored image to a removable memory medium.

5. The device of claim 1, wherein said processor is capable of replacing one or more archived images in said memory with a newly captured image when said memory is incapable of storing said newly captured image, with the replacing step comprising replacing an oldest archived image as indicated by a date/time information in a date/time storage cell of a record in said memory.

6. The device of claim 1, wherein said memory comprises an internal memory.

7. The device of claim 1, wherein said memory comprises a removable memory medium.

8. A memory management method for a memory of an image capturing device, comprising the steps of:
 transferring a copy of an image out of said memory during an image archiving operation;
 marking said image in said memory as an archived image;
 automatically replacing an archived image with a newly captured image if said memory lacks sufficient free space to store said newly captured image; and
 automatically disabling image capture if said memory is full and said memory does not contain any archived images.

9. The method of claim 8, wherein the transferring step comprises transferring said copy to an external computer device.

10. The method of claim 8, wherein the transferring step comprises transferring said copy to a removable memory medium.

11. The method of claim 8, wherein the marking step comprises changing a status variable in an associated status storage cell to an archived state.

12. A memory management method for a memory of an image capturing device, comprising the steps of:
 determining whether said memory is capable of storing an additional image;
 storing a captured image in said memory if sufficient free space exists in said memory;
 determining if said memory contains at least one archived image, if said memory is not capable of storing said captured image; and
 replacing said at least one archived image with said captured image if said memory is not capable of storing said captured image and if said memory contains said at least one archived image,
 wherein an image capture is disabled if said memory is full and if said memory does not contain at least one archived image.

13. The method of claim 12, wherein the method is performed upon a press of a shutter button of said image capturing device.

14. The method of claim 12, wherein the method is performed upon completion of an image capture.

15. The method of claim 12, wherein the step of determining additional image storage capability includes inspecting status variables corresponding to each image stored in said memory.

16. The method of claim 12, wherein an archived image comprises a captured image a copy of which has been transferred to a removable memory in said image capturing device.

17. The method of claim 15, further comprising the step of changing a status variable of a replaced archived image to a non-archived status.

18. The method of claim 12, wherein an archived image comprise a captured image a copy of which has been transferred to an external memory connected to said image capturing device.

19. The method of claim 12, wherein an archived image comprise a captured image a copy of which has been transferred to an external memory connected to said image capturing device and to a removable memory in said image capturing device.

* * * * *

UNITED STATES PATENT AND TRADEMARK OFFICE
CERTIFICATE OF CORRECTION

| | |
|---|---|
| PATENT NO. | : 7,123,295 B2 |
| APPLICATION NO. | : 09/934626 |
| DATED | : October 17, 2006 |
| INVENTOR(S) | : John M. Baron et al. |

It is certified that error appears in the above-identified patent and that said Letters Patent is hereby corrected as shown below:

In column 5, line 16, in Claim 1, delete "Memory" and insert -- memory --, therefor.

In column 6, line 45, in Claim 18, delete "comprise" and insert -- comprises --, therefor.

In column 6, line 49, in Claim 19, delete "comprise" and insert -- comprises --, therefor.

Signed and Sealed this

Fifth Day of May, 2009

JOHN DOLL
*Acting Director of the United States Patent and Trademark Office*